United States Patent [19]
Fix, Jr.

[11] Patent Number: 5,923,558
[45] Date of Patent: Jul. 13, 1999

[54] AUTOMATED INTEGRATED INPUT-OUTPUT CONTROL SYSTEM APPARATUS

[75] Inventor: John William Fix, Jr., Palm City, Fla.

[73] Assignee: Fusion Bonding Corp., Palm City, Fla.

[21] Appl. No.: 08/870,949

[22] Filed: Jun. 6, 1997

Related U.S. Application Data

[63] Continuation-in-part of application No. 08/470,257, Jun. 6, 1995, Pat. No. 5,699,952
[60] Provisional application No. 60/019,648, Jun. 11, 1996.
[51] Int. Cl.$^6$ .............................. G06F 19/00; G06G 7/66
[52] U.S. Cl. .................... 364/474.02; 701/102; 701/103; 701/104; 701/105; 706/903; 706/904; 706/906; 706/907; 451/65; 166/70; 166/153; 123/401
[58] Field of Search ....................... 364/474.02; 701/102, 701/103, 104, 105; 137/536, 540; 451/65; 706/903, 904, 906, 907, 911, 912, 919; 166/70, 153; 123/401

[56] References Cited

U.S. PATENT DOCUMENTS

| | | | |
|---|---|---|---|
| 5,297,488 | 3/1994 | Bunch, Jr. ............................. | 101/182 |
| 5,558,265 | 9/1996 | Fix, Jr. ..................................... | 228/2.3 |
| 5,699,952 | 12/1997 | Fix, Jr. ..................................... | 228/102 |
| 5,735,447 | 4/1998 | Fix, Jr. ................................. | 228/114.5 |

OTHER PUBLICATIONS

Frank Yeaple: Fluid Power Design Handbook, 1990; Second Edition;pp. 391–528; Marcel Dekker,Inc: New York, NY.

*Primary Examiner*—William Grant
*Assistant Examiner*—McDieunel Marc
*Attorney, Agent, or Firm*—Sankey & Luck LLP

[57] ABSTRACT

The automated integrated input-output control system apparatus. A versatile industrial control apparatus that can be utilized as a modular unit or integrated into industrial machinery or tools to provide an apparatus and method for programmable control of industrial tools, industrial controls and manufacturing operation processes. The automated integrated input-output control system apparatus includes the following components: a control-power mechanism housing, a sensor, input attachment devices, output attachment device, and a control system.

50 Claims, 8 Drawing Sheets

AUTOMATED INTEGRATED INPUT-OUTPUT CONTROL SYSTEM APPARATUS

CROSS REFERENCE TO RELATED APPLICATIONS

This application is a continuation-in-part of application Ser. No. 470,257, filed Jun. 6, 1995, now issued as U.S. Pat. No. 5,699,952, the disclosure of which patent is herein incorporated by reference.

REFERENCE TO PROVISIONAL APPLICATION

Pursuant to 35 U.S.C. §119(e), this application derives from a provisional application for the same invention filed on Jun. 11, 1996, provisional Ser. No. 60/019,648.

BACKGROUND OF THE INVENTION

1. Field of the Invention

This invention relates generally to an apparatus and method for the control of industrial tools, industrial controls and manufacturing operation processes, and this invention specifically relates to an automated integrated input-output control system apparatus, operable via low pressure air sources commonly found in industrial settings, and methods for its use, although not limited to air as the power source since other fluids may be applicable.

2. Description of the Prior Art

Industry utilizes many different types of tools and machinery to perform various manufacturing, repair and other industry related functions. Some of the tools and machinery are portable to be carried to the work site and some are too heavy and must be permanently installed in place on site. Automation of industrial tools and equipment has been on the forefront of the industrial community agenda for many years. In general, industry will continue to develop robotic type control systems that utilize position, timing and other multifaceted control input signals that are fixed in a relationship or variable and programmable and whose inputs can be fed back to operate cylinders, air motors, actuators and other output devices that respond to automated manufacturing process requirements, air tool operation, machine operation and safety requirements and control of other industrial applications.

One use of such a robotic control system for either portable air tools or manufacturing equipment would be to sense the relative proximity of a fixture or part by a sensor. The output from that sensor becomes an input to a logic device or pilot operated valve which then supplies air to a pneumatic cylinder that provided linear motion or other type output type function such as rotation from an air motor, or other output interface functions from hydraulic system, electrical system, etc., to perform an end manufacturing, safety shutdown or other machining type operation.

The automated manufacturing process requirements, machine operation and safety requirements and control of other industrial applications is generally achieved by the use of off-the-shelf components that, when coupled together, provide sensing and output functions that industry requires. Some of the problems include the incompatibility of the components with one another and, many times, the inability to use single source low pressure air sources commonly found in industrial settings, and methods for its use. For example, some of the components may require specially treated plant air at low pressures and with special filtration while other system components may require plant air at higher pressures and flows where costly filtration and pressure regulation is not a concern.

A typical control system for a manufacturing plant may require that a component is sensed before performing a machine operation. The component is sensed at a specific location with a pneumatic sensor which sends out a pressure signal to pneumatic, electrical or hydraulic logic or a pilot section of an air valve which causes that air valve to open and permit air that is blocked to flow. The air released through the pilot operated valve may flow direct to an air motor which performs a rotatable operation on the part that was sensed in place or the air flowing from the air valve may pressurize an actuator cylinder or other component to perform the second step of the operation. Other operations caused by the pressurized air could be output operations such as electrical interface switches, hydraulic interface devices, or other interface input-output devices.

A typical control system for a manufacturing plant may also utilize an air operated, mechanical or electrical timer during a machine operation. The timer sends out a pneumatic signal to a pilot section of an air valve which causes that air valve to open and permit air that is blocked to flow. The air released through the pilot operated valve may flow direct to an air motor which performs an operation on the part that was sensed in place or the air flowing from the air valve may pressurize an actuator cylinder or other component to perform the second step of the operation. Other operations caused by the pressurized air could be output operations such as electrical interface switches, hydraulic interface devices, or other interface input-output devices. There are other pneumatic, electrical, hydraulic and mechanical devices that provide input to perform much the same functions as outlined above.

Other problems associated with typical state-of-the-art input-output control systems are the requirement to amplify small low pressure sensing signals VIA other amplifier components so as to operate large pilot-type air valves that provide both high pressure and high flow to an air cylinder.

Typically, without an integrated flow impedance matched system, an input-output control system may function well under one operating environment, but fail to provide the desired operational characteristics once the operation environmental conditions are changed. One solution to the above-outlined problems is the integration of components which are flow impedance matched, that is to suggest that all components are compatible as to pressure and flow when installed and operational.

John Fix, the inventor of the present invention, invented a portable friction welder in late 1994. This friction welder is robotic in operation and can effectively be used at remote industrial plant operations using compressed plant air as its power source. An integrated control system using many of the same features similar to that presented herein was made part of that invention. A patent was applied for on Jun. 7, 1995, (U.S. patent application Ser. No. 08/470,257; Automated Fusion Bonding Apparatus). Prototype tests of the control system have proven the integrated input-output control system effective for that apparatus.

The advantages of an automated integrated input-output control system apparatus include, but are not limited to: (1) position sensing can be designed to be more accurate because it is pressure flow impedance matched; (2) a common plant air source regulator can be used, as opposed to separate pressure regulation supply sources, thus eliminating the requirement of separate pressure regulators, air lines, fittings, valves and other related components; (3) plant air filtration problems are eased so that microfilters may not be required in the sensing and amplification systems; (4) system integration permits ease of installation and eliminates calculations or guess work; (5) installation can be completed by persons not trained in the control technology by following easy instructions for setting up the automated integrated input-output control system apparatus in an intense industry setting where system installation and change out is critical to productivity; (6) the automated integrated input-output control system apparatus can be fabricated from a wide range of materials, and is suited for fabrication from aluminum, which will result in a lightweight industrial control component; (7) persons installing the automated integrated input-output control system apparatus do not require special skills in matching of fluid power components; (8) operators are not required to have special skills in starting or stopping the operation; (9) the integrated input-output control system in easily automated for mass production; (10) input control components can be interchanged easily for greater flexibility and servicing; and (11) installation of the automated integrated input-output control system apparatus is made rapidly, compared to other componentized control system installations.

A number of disadvantages exist with the conventional automated input-output control systems, which are basically made up of off-the-shelf components such as sensors, timers, pilot operated air valves, and other input or output devices. The problem arises when attempting to create the ideal robotic automated control system with unmatched components. For example, some of the limitations of mix and match components include, but are not limited to: (1) a sensor output may not have the proper output signal to operate a conventional pilot operated air valve and, thus, the requirement for some amplification or reduction of the signal strength; (2) off-the-shelf conventional pilot operated air valves are made to be controlled from a specific range of input pressure and flows and provide only a specific range of output pressure and flow; (3) incompatibility of the components with one another may not permit the use of single source low pressure air sources commonly found in industrial settings. (4) some of the components may require low pressures and the use of special regulators, while other system components may require plant air at high pressures; (5) special filtration systems may be required for some system components while others can use standard industrial filtration systems. (6) some of the components may fail if oil is utilized as a lubricant in the operating system air, while other system components may fail if plant air is not supplied with a lubricant; (7) some system components may require specially treated plant air at low pressures and the use of special regulators while other system components may require plant air at higher pressures and flows; (8) in rigorous applications such as those present in the industrial environment, the electronic controls are often prone to failure; (9) hydraulic, electrical and mechanical input-output systems are not always easily integrated with pneumatic systems; (10) the presence of electronic controls requires the presence of an electrical power sour, which is often unavailable, impractical or hazardous in the industrial settings: (11) most off-the-shelf input-output control systems are not scalable and, therefore, cannot be miniaturized or effectively made large enough to meet universal industrial applications; (12) the end user must make concessions in power requirements, control system efficiency, speed, and costs; (13) there are programmable control limitations; and (14) end users must face difficult use limitations and field setup time constraints.

Thus, while most off-the-shelf componentized automated input-output control systems offer significant advantages over the operator dependent systems, there has been a need in the art for an automated integrated input-output control system apparatus that offers the end user a wide range of operating features with multifunctional programmable capability.

There has been an additional need in the art for an automated integrated input-output control system apparatus which can be used in a variety of applications, so as to obviate the need for many different and unmatched input-output components.

There has also been a need in the art for an automated integrated input-output control system apparatus with expanded capabilities with respect to associated programmable controls.

There has also been a need in the art for an automated integrated input-output control system apparatus, which is impedance matched, so the end user does not have to search the industry for various matching components.

There has been an additional need in the art for an automated integrated input-output control system apparatus which does not require complex componentization.

There has been a further need in the art for an automated integrated input-output control system apparatus which does not require different pressure regulators of air filtering systems for individual components.

There has also been a need in the art for an automated integrated input-output control system apparatus that can be easily installed without special training in fluid control systems.

There has also been a need in the art for an automated integrated input-output control system apparatus that can be designed for specific applications and mass produced at an acceptable cost and can be fabricated from a wide range of materials, and is suited for fabrication from aluminum which will result in a lightweight industrial control component.

There has been an additional need in the art for an automated integrated input-output control system apparatus that houses sensing, timing and other input features in one integrated housing, whereas input components can be interchanged quickly and are easily pressure flow impedance matched.

SUMMARY OF THE INVENTION

The present invention solves significant problems in the art by providing an automated integrated input-output control system apparatus and a method for its use. Generally described, the present invention provides for an automated integrated input-output control system that is pressure flow impedance matched and can be adapted to portable air tools, manufacturing operations and other industry control operations, while providing for an automated integrated input-output control apparatus that can use pressurized air sources commonly available at industrial facilities, automotive repair shops, and other manufacturing plants. The automated integrated input-output control system apparatus generally includes unique sensing devices, timing devices, sensor transducer devices, one way flow control devices, pressure-flow regulating devices, differential pressure air valve, integral housing, start valve, and stop valve. The automated integrated input-output control system apparatus can be made an integral part of an air tool.

In a preferred embodiment for controlling a manufacturing operation or industrial operation, the automated integrated input-output control system apparatus provides for robotic control of manufacturing operation or industrial operation, wherein the process for robotic control comprises operator start-stop features, programmable timing, sensing and safety functions to control and provide primary airflow at standard plant air pressures to operate machinery and equipment, whereas input devices, (sensors, timers, etc.,) provide signals to cause the differential air pressure valve to open and close and thus operate actuators, cylinders, air motors, hydraulic motors, electrical pressure switches, and other such output devices.

The apparatus includes a housing, integrated sensors, integrated timers, mechanical one way flow valves, external input ports, diagnostic pressure ports, and a primary differential flow valve. The primary differential flow valve provides for turning on and shutting off of the primary air flow to the output system. The external input ports provide for using external input devices such as isolated pneumatic sensors and timers or pneumatic inputs from electrical, mechanical or hydraulic input systems.

The apparatus further includes a programmable control system feature for presetting the timers and the sensors to cause the primary differential flow valve to open and close at specific times or positioning of output devices. The control system is operably engaged to the primary differential flow valve which is slidably disposed within the housing, wherein the primary differential flow valve supplies fluid flow to output devices.

In other aspects, the apparatus further includes a support means removably engageable to the housing which is adapted to attach the automated integrated input-output control system to any industrial platform for security reasons.

In another preferred embodiment of the invention, for controlling a manufacturing operation, air tools or industrial operation, the automated integrated input-output control system apparatus provides for robotic control of manufacturing operation or industrial operation, wherein the process for robotic control comprises operator start-stop features, programmable timing, sensing and safety functions to control and provide primary airflow at standard plant air pressures to operate machinery and equipment, whereas input devices (sensors, timers, etc.,) provide signals to cause the differential flow valve to open and close and thus operate actuators, cylinders, air motors, hydraulic motors, electrical pressure switches, and other such output devices. The apparatus includes: (1) a programmable control system for controlling the operation of the apparatus including control flow passage and control elements; (2) a primary differential flow valve means in the housing; (3) an upper pressurization chamber connected to the control flow passages and the primary differential flow valve; (4) a lower pressurization chamber connected to the control flow passages and the primary differential flow valve; (5) an inlet pressurization peripheral chamber connected to the control flow passages and the primary differential flow valve; (6) a start valve connected to the housing for selectively starting circulation of the pressurized fluid to the apparatus to open the primary differential flow valve to permit flow to output devices; (7) a stop valve connected to housing for selectively stopping circulation of the pressurized fluid to the apparatus to shut off fluid flow to output devices from the primary differential flow valve means; and (8) external input control ports.

In still other aspects of this embodiment, the apparatus includes: (1) a first programmable timing disposed within the housing which overrides the control system to shut down the apparatus after a preprogrammed time period; and (2) a second programmable timing disposed within the housing which overrides the control system to provide for a predetermined operational period after the start valve has been depressed or an external start signal has been received.

In other aspects of this embodiment, the apparatus further includes a preprogrammable sensing device that can be disposed within the housing or located externally on other machinery. The apparatus further includes a sensor mechanism shaft and a threaded portion and the sensor device is adjustable by being rotated along the threaded portion. The air flow flows through the sensor until it is blocked to detect a programmed position, thus permitting the pressure to increase as signal to a predetermined position relative to that machine operation or industrial reference being sensed.

In other aspects of this embodiment, the apparatus further includes a sensor transducer that reacts to the pressure signal from the sensor and sends a pressure signal of significant flow and pressure to cause the primary differential flow valve to close and shut off the flow. The flow to the sensor is derived from the sensor pressure transducer and fluid flow speed is in the range of high subsonic to supersonic to maintain a low pressure differential across the primary differential flow valve when it is in the open position.

In other aspects of this embodiment, the apparatus further includes a piston located within the housing which is the main component of the primary differential flow valve which opens or shuts off the flow of pressurized air, such as air motors, cylinders, hydraulic systems, electrical systems, mechanical systems, etc.

In another embodiment of the invention, a method of controlling a manufacturing operation or industrial operation is provided. The method includes the steps of: (1) providing a housing with integrated controls; (2) providing a mounting bracket for the external housing; (3) providing a sensor and pressure signal feedback tubing to attach to the housing; (4) providing a source of pressurized fluid energy to the housing which provides flow to the control system and the primary differential flow valve means; (5) starting the operation by an external sensor or manual start valve pressure signal, which opens the primary differential flow valve to permit flow to enter an output device; (6) sensing a programmed position in a machine operation or other industrial application or receiving a pressure signal from a programmable timing means or external input device to close the primary differential flow valve and shut off flow to the output device; (7) continuing the cycle if automatic or received an input from another input device; or (8) shutting down the system with the main stop valve or shutting off the source of pressurized fluid energy to the housing.

In yet another embodiment of the invention, a programmable control system for controlling a manufacturing operation or industrial operation is provided, wherein the automated integrated input-output control system apparatus includes a robotic control system which comprises operator start-stop features, programmable timing, sensing and safety functions to control and provide primary air flow at standard plant air pressures to operate machinery and equipment, whereas input devices (sensors, timers, etc.,) provide signals to cause the primary differential flow valve to open and close and thus operate actuators, cylinders, air motors, hydraulic motors, electrical pressure switches, and other such output devices. The primary differential flow valve can be designed to provide two-way, three-way and four-way output capability. The programmable control system for the automated integrated input-output control system apparatus including, but not limited to: (1) a quick disconnect assembly through which plant air flows to the automated integrated input-output control system apparatus, the quick disconnect assembly releasably coupled to a fitting threaded into the housing; (2) a primary differential flow valve disposed within the housing to turn on and shut off flow of the plant air; (3) a plurality of pressure-flow passages disposed within the housing through which the plant air flows to output devices, and the atmosphere as exhaust; (4) a start valve connected to the housing which starts circulation of the plant air to the programmable system; (5) a stop valve connected to the housing which stops circulation of the plant air to the programmable system; (6) diagnostic ports disposed within the housing which measure pressure throughout the programmable control system; (7) a programmable sensor externally coupled to the housing which programs a desired position of an industrial or machine tool component and measures the position in a fixed relationship with a specific component in an industrial manufacturing application and stops circulation of the plant air to the output device when the position is reached; (8) a programmable first timing disposed within the drive-pressure mechanism external housing which overrides the programmable control system to shut down the apparatus after a preprogrammed time period; (9) a programmable second timing disposed within the drive-pressure mechanism external housing which overrides the programmable control system to provide for a predetermined operational period after the start valve has been depressed; (10) a multiport valve connected to the housing which overrides the start valve and the programmable control system.

In one aspect of this embodiment, the plant air is pressurized and is supplied to the programmable control system through a pressure flow line releasably coupled to the housing inlet fitting. In other aspects, the programmable first timing and/or the programmable second timing are digital fluidic logic devices or analog fluid logic devices. Accordingly, it is an object of the present invention to provide a fully automatic automated integrated input-output control system apparatus. It is another object of the present invention to provide an automated integrated input-output control system apparatus which works independently of the operator during the control process after the operator depresses the start button. It is yet another object of the present invention to provide an automatic automated integrated input-output control system apparatus which does not have separate unmatched control system components coupled by one form or another.

Another advantage of the present invention is that the operator is removed from making critical decisions, which would demand complex calculations.

DETAILED DESCRIPTION OF THE PREFERRED EMBODIMENTS

Figure 1:
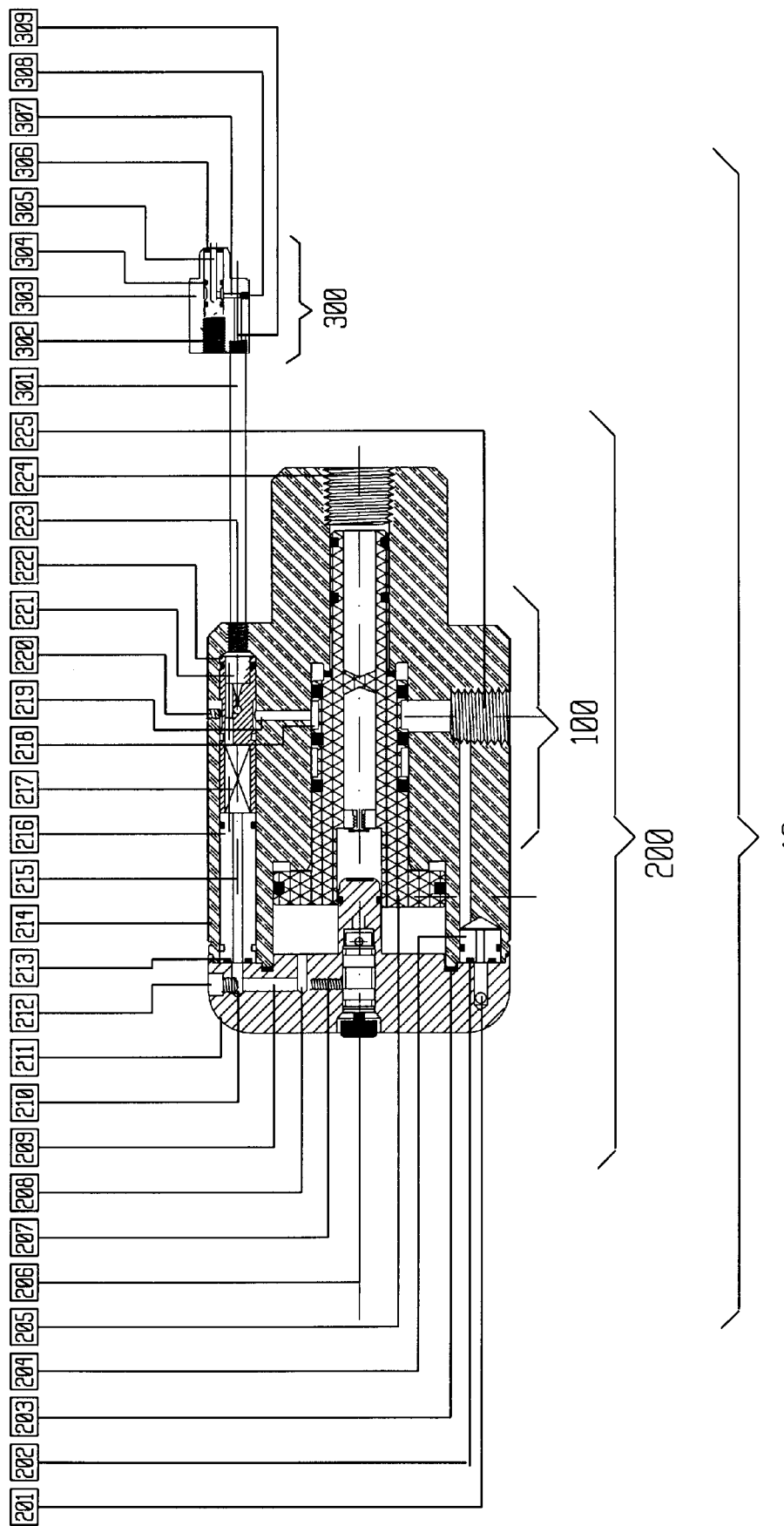
FIG. 1 is first cross-sectional side view, including sensor mechanism, of a preferred embodiment of the automated integrated input-output control system apparatus of the present invention.
Figure 2:
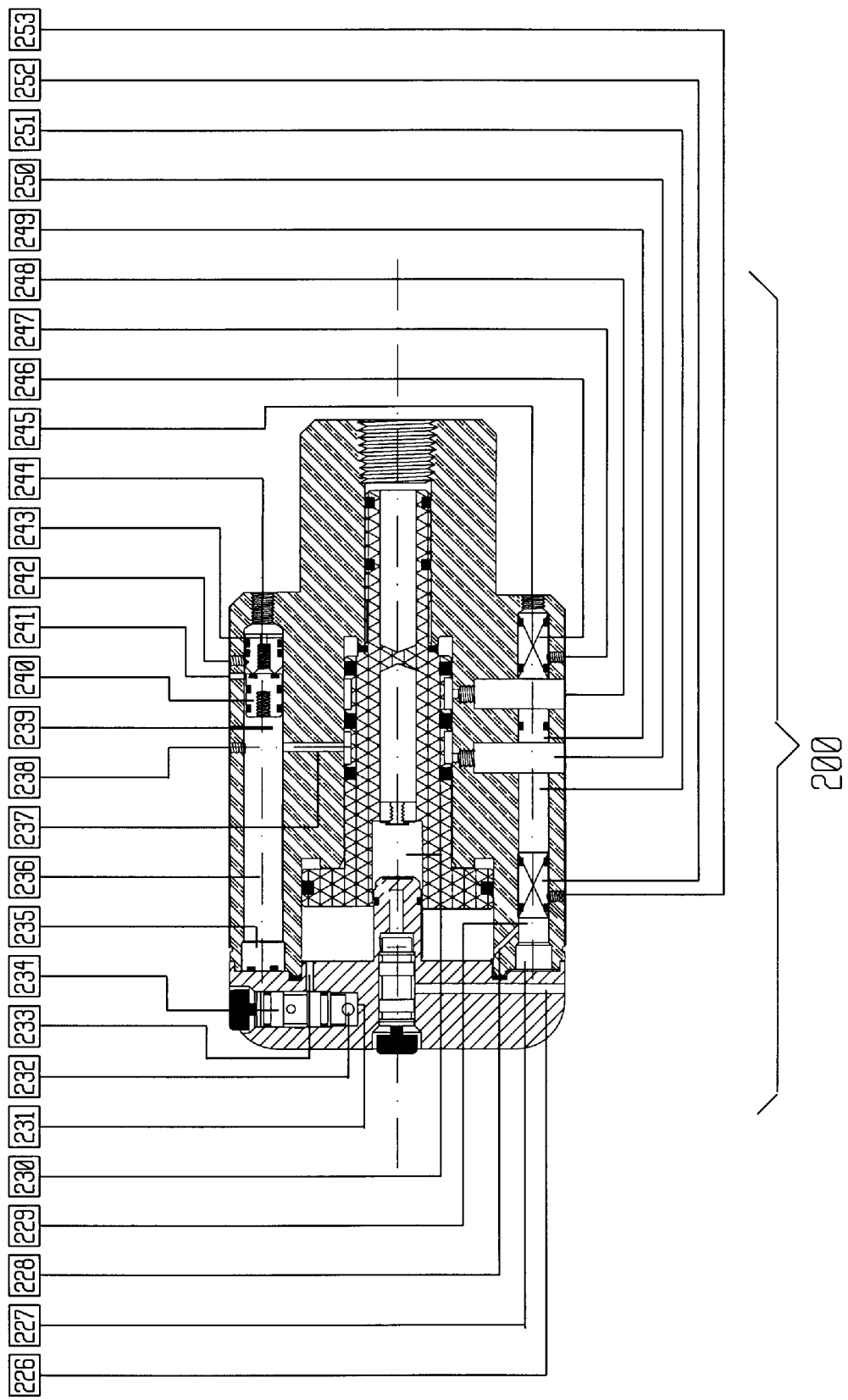
FIG. 2 is second cross-sectional side view of a preferred embodiment of the automated integrated input-output control system apparatus of the present invention.
Figure 3:
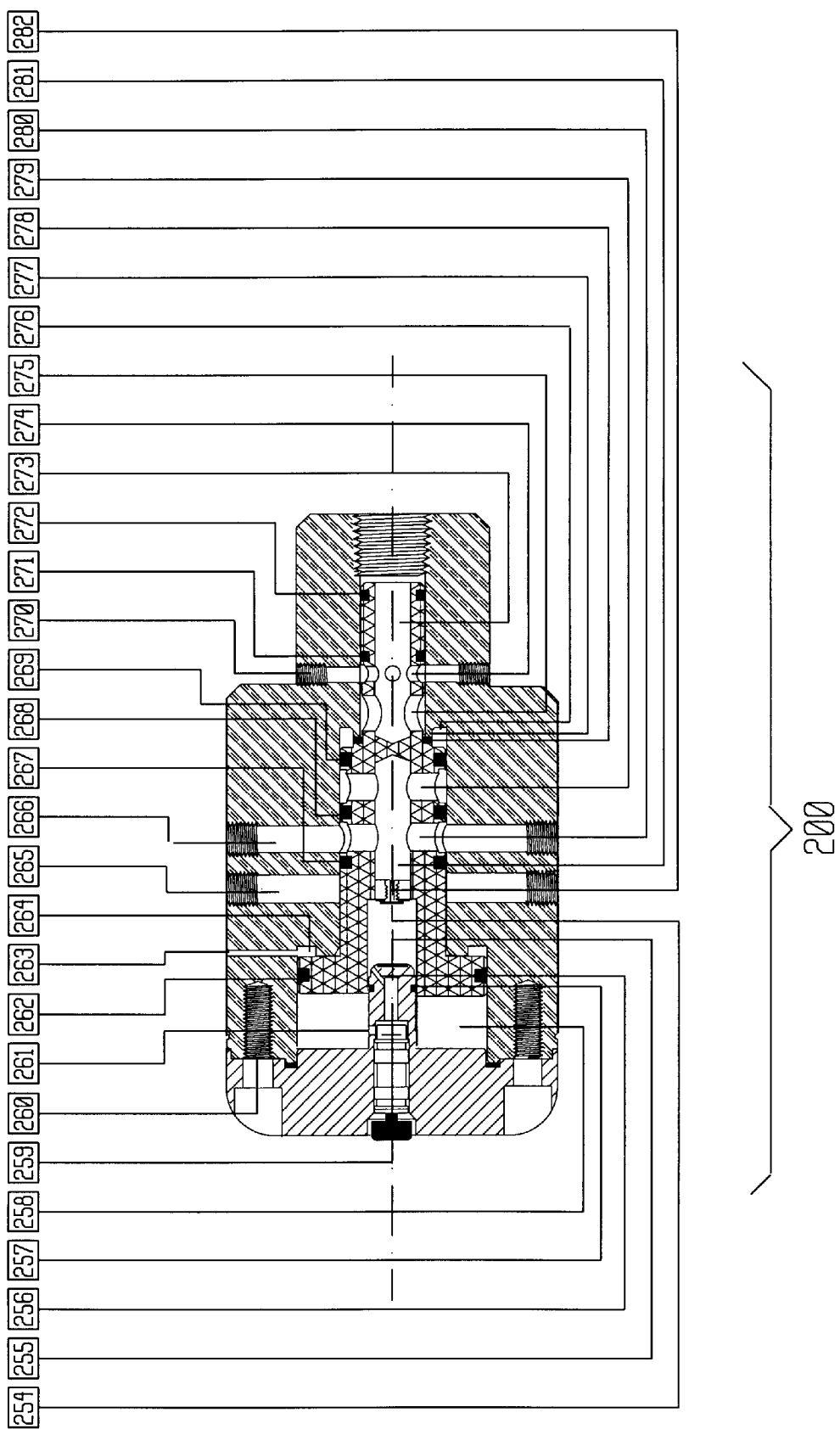
FIG. 3 is third cross-sectional side view of a preferred embodiment of the automated integrated input-output control system apparatus of the present invention.
Figure 4:
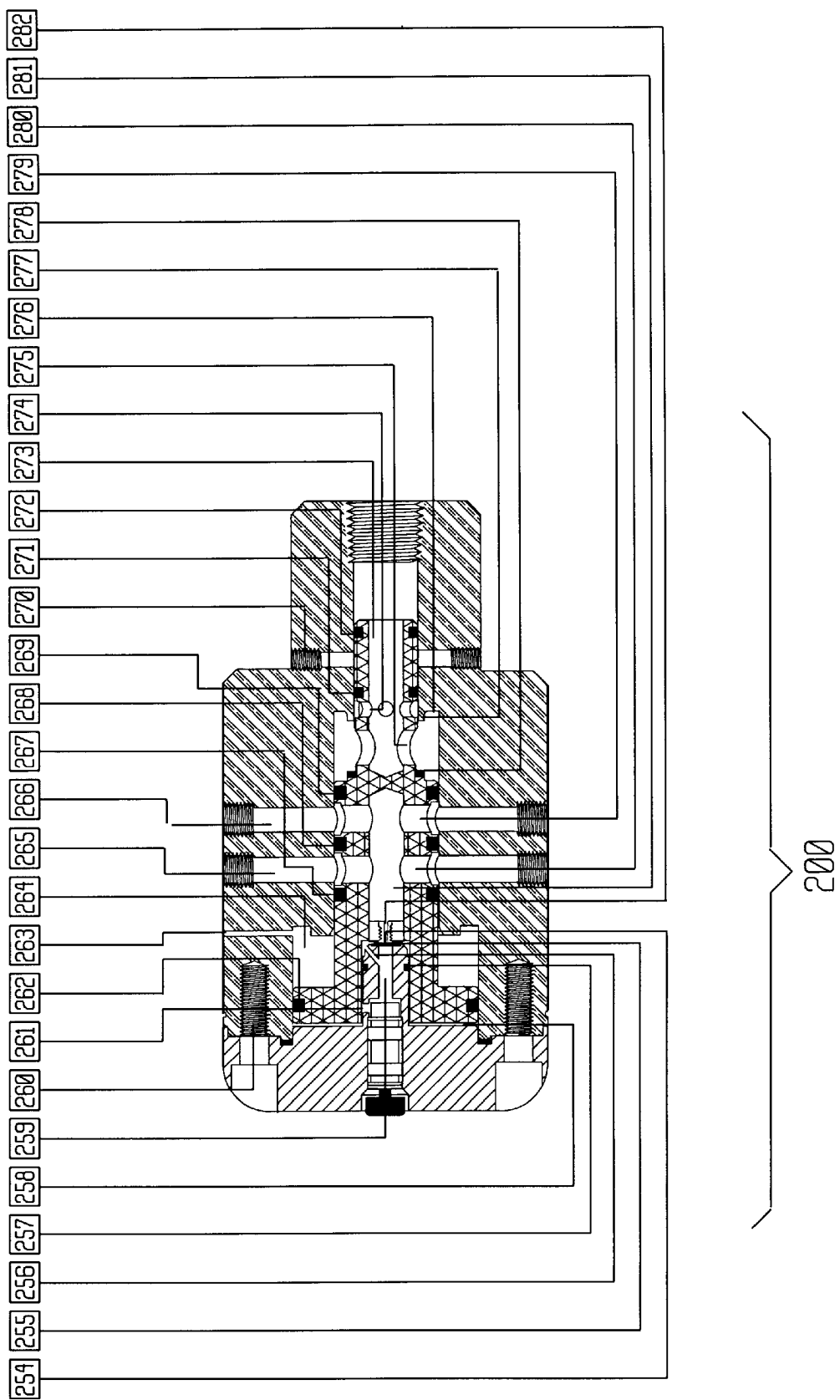
FIG. 4 is third cross-sectional side view of a preferred embodiment of the automated integrated input-output control system apparatus of the present invention.
Figure 5:
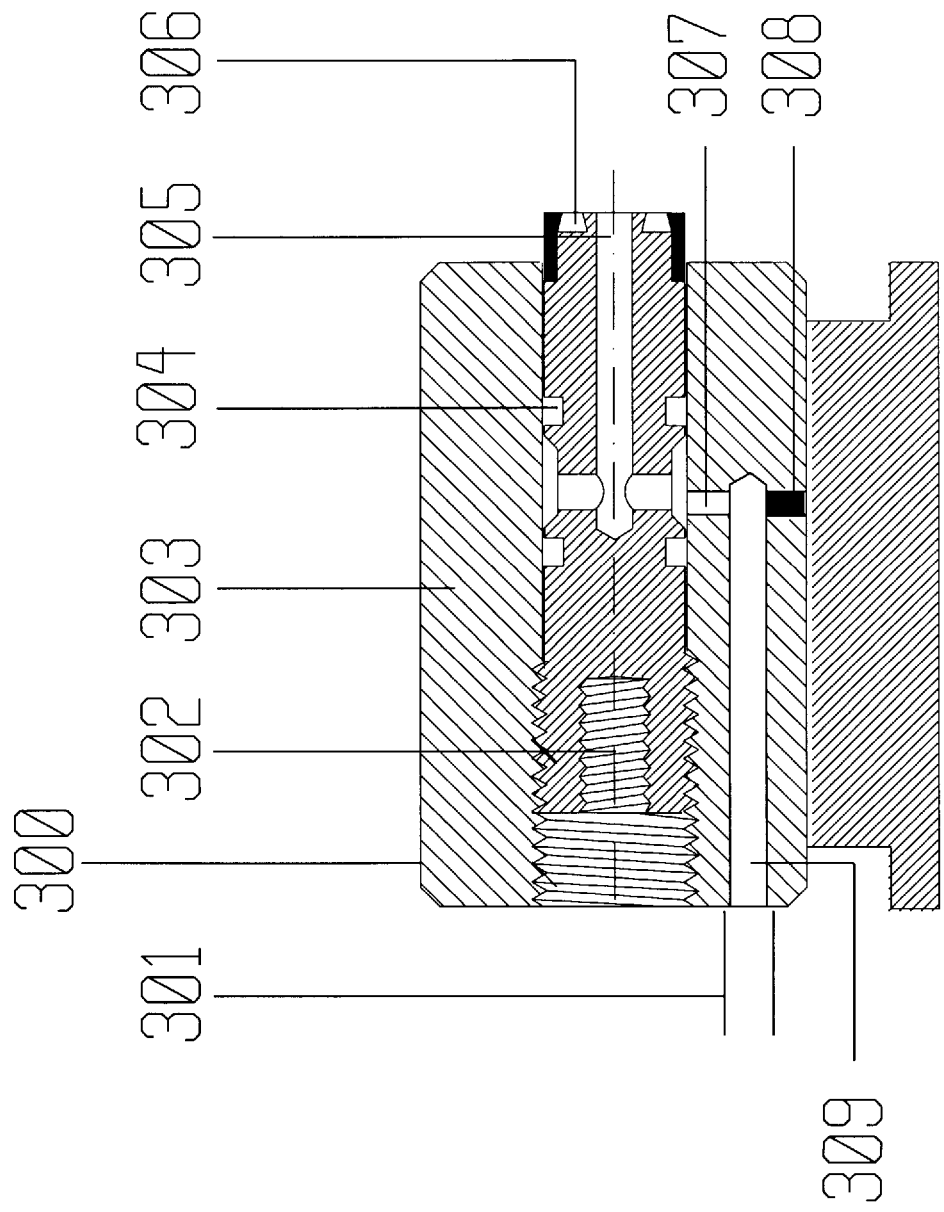
FIG. 5 is a cross-sectional view of the sensor mechanism of a preferred embodiment of the automated integrated input-output control system apparatus, of the present invention.
Figure 6:
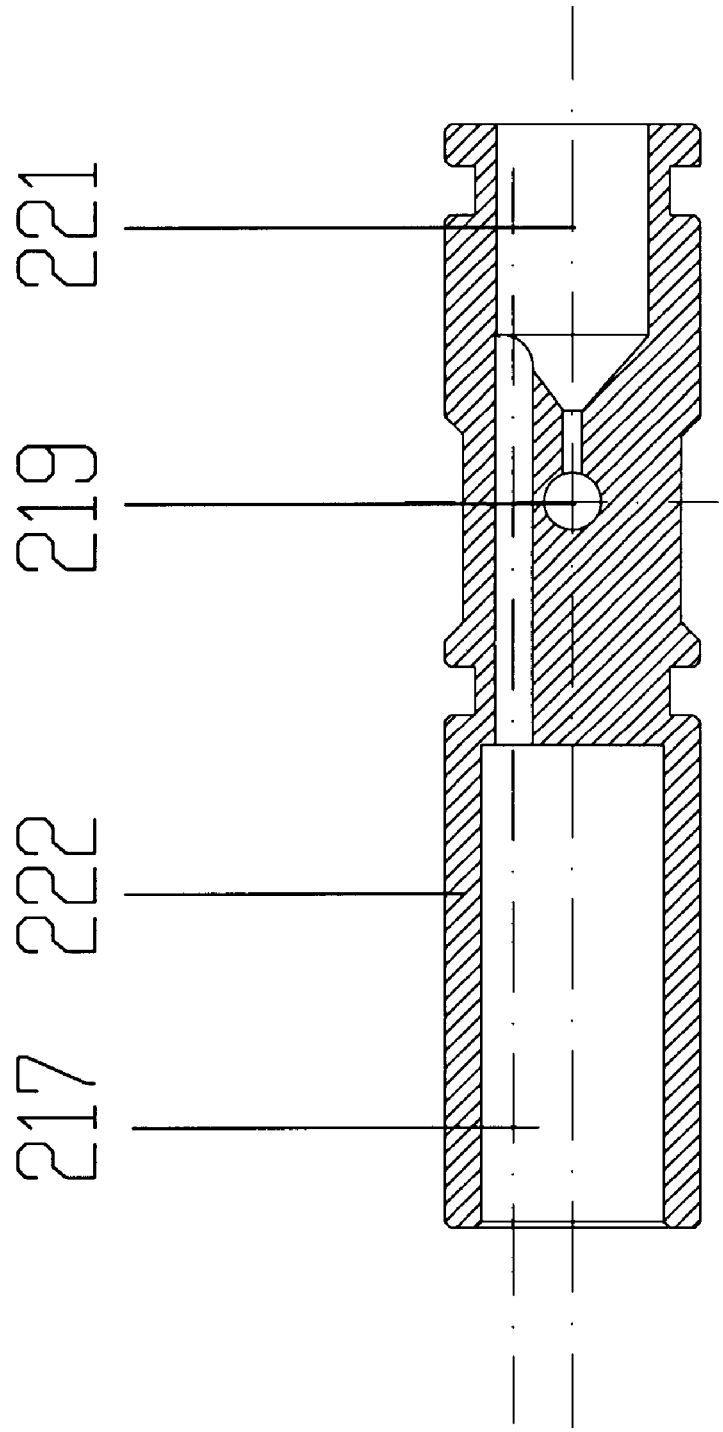
FIG. 6 is a cross-sectional view of the sensor transducer of a preferred embodiment of the automated integrated input-output control system apparatus of the present invention.
Figure 7:
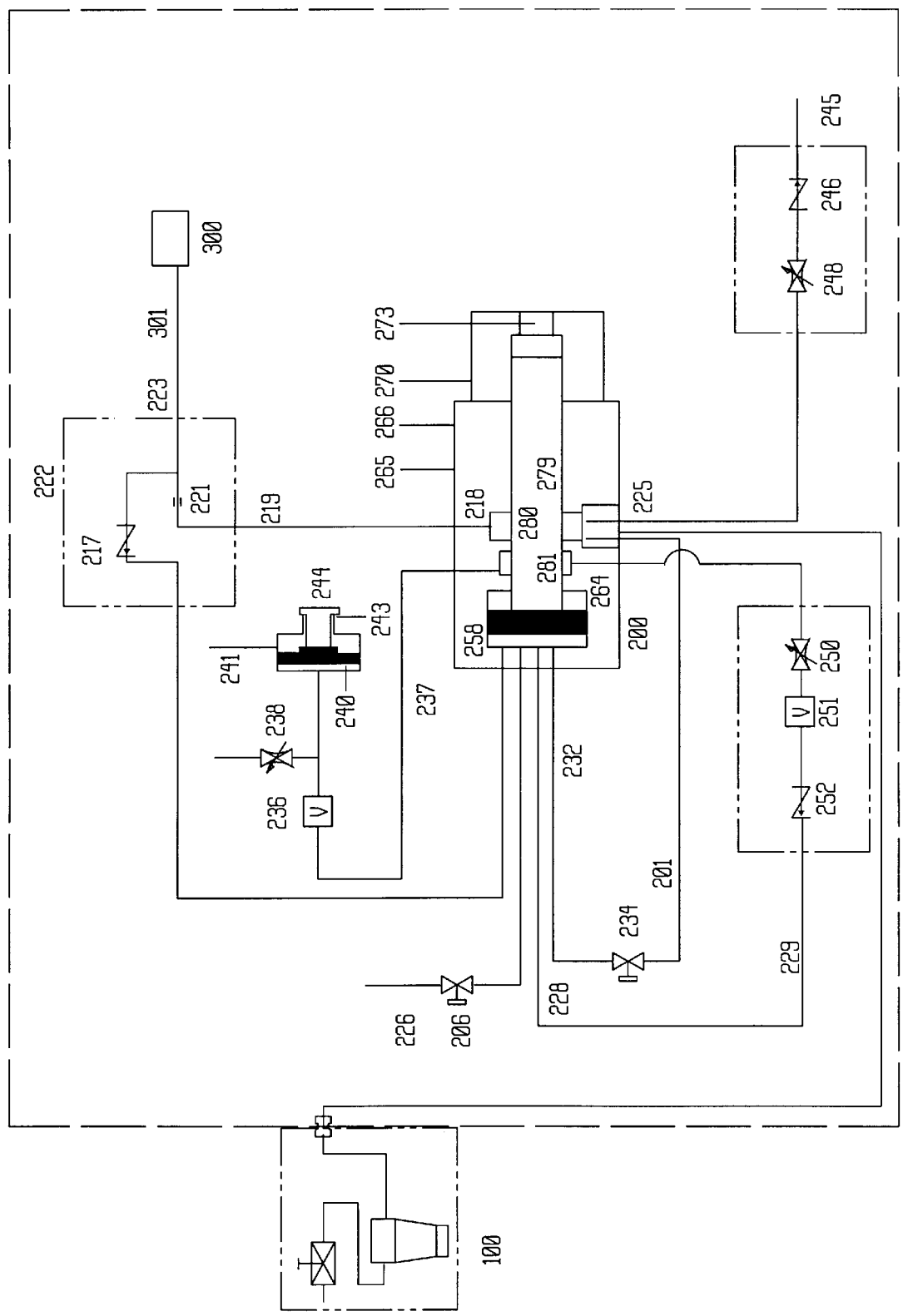
FIG. 7 is a schematic of the control system of a preferred embodiment of the automated integrated input-output control system apparatus of the present invention.
Figure 8:
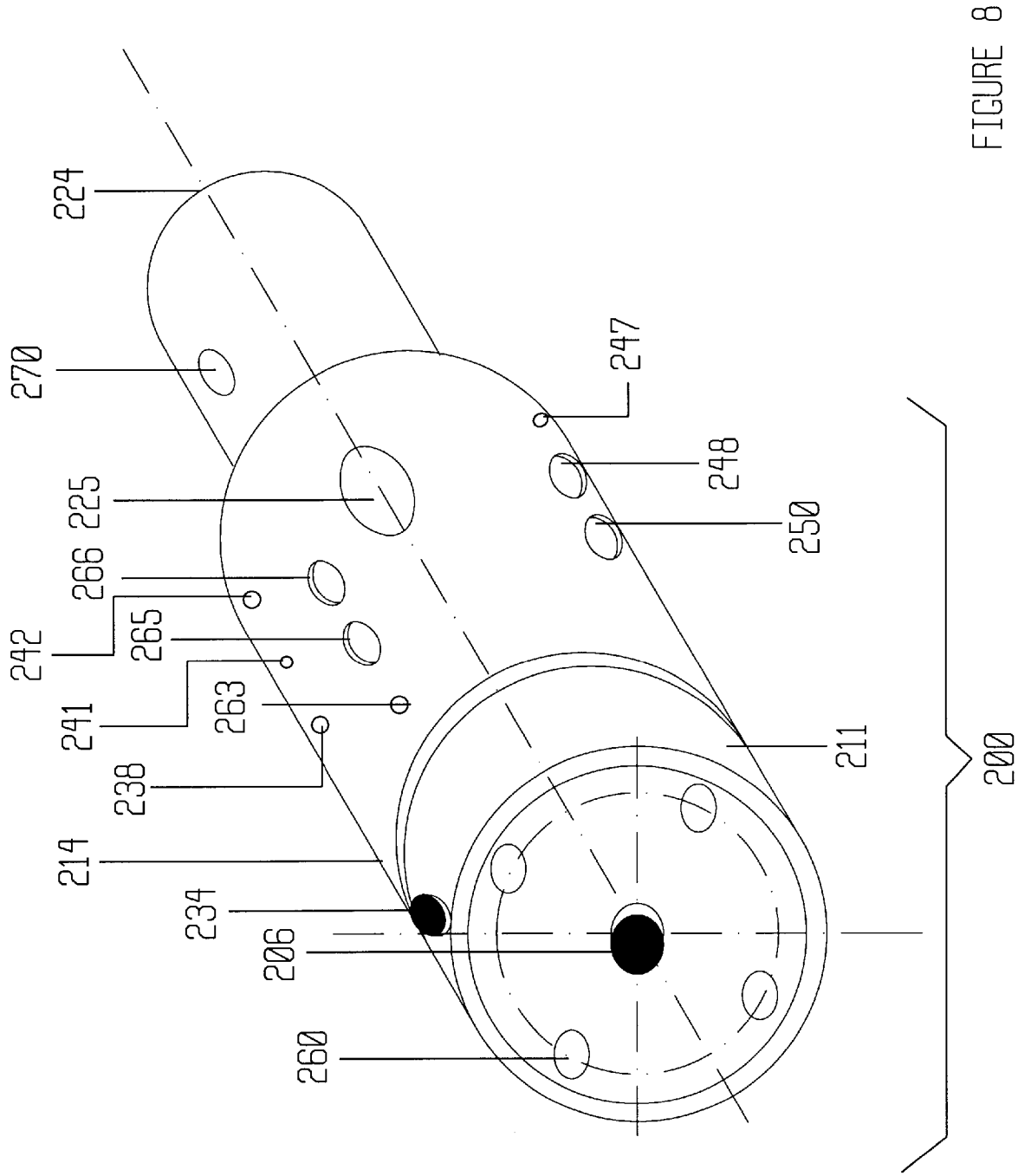
FIG. 8 is an oblique view of a preferred embodiment of the control system of the present invention.

Referring initially to FIGS. 1–8 of the drawings, in which like numerals indicate like elements throughout the several views, in a preferred embodiment of the automated integrated input-output control system apparatus of this invention is generally illustrated by reference numeral 10.

The automated integrated input-output control system apparatus 10 is set forth in FIGS. 1–8, and generally includes a plant air supply system 100, a control-power mechanism 200 and a sensor mechanism 300. These components are integrally coupled in a manner described below.

Referring to FIGS. 1–4 and 6–7, plant air supply system 100 provides for the source of pressurized fluid energy. Plant air supply system 100 includes compressed air, pressure regulators, lubricators, air driers, air filters as may be appropriate, air hoses, quick disconnects and inlet fitting adaptable to the automated integrated input-output control system apparatus 10. The supply source quick disconnect (not shown) allows greater ease in transportation and set up of automated integrated input-output control system apparatus 10, as well as emergency disconnect of the power source when an immediate shut down might be necessary. The supply source quick disconnect is installed via mating threads in a supply fluid inlet port 225. The control-power mechanism 200, provides for the ability to send and receive pressure and vent signals from within and from other electrical, hydraulic, pneumatic and mechanical systems so as to provide various pressure-flow outputs. Sensor mechanism 300 is a pressure flow impedance matched device that can be isolated away from control-power mechanism 200, either attached to industrial machinery or made an integral part of an air tool or other industrial equipment so as to feed back positioning information to control-power mechanism 200.

In a preferred embodiment, supply fluid inlet port 225 with internal threads is located on a housing 214, located midway to the distal end, considering a housing cap 211, the proximal end, and a primary flow output port "A" 224, the distal end. Housing cap 211 and housing 214 may be formed of aluminum, composite materials, molded aluminum, plastic or other strong, lightweight materials. While in a preferred embodiment, the geometry of the automated integrated input-output control system apparatus 10 is generally cylindrical, other geometries are applicable in some cases. Most of the components can be machined to custom considerations, but some off-the-shelf components will be illustrated as examples in this detailed description.

By further reference to FIGS. 1–4, fluid entering supply fluid inlet port 225 is channeled to a supply fluid peripheral manifold 218, the geometry of which permits the required air flow to be maintained at operation nominal inlet pressures of approximately 80 to 120 pounds per square inch, with flow volume requirements, depending on the size of automated integrated input-output control system apparatus 10 and/or its output devices, generally within the range of 3–100 cubic feet per minute. When plant air supply system 100 is connected to the automated integrated input-output control system apparatus 10, the air is distributed from supply fluid peripheral manifold 218 when the automated integrated input-output control system apparatus 10 is in either its normal shut-off or its open position, unless a spring is used to reset the system to normal shut-off when the plant air is removed.

Immediately upon providing plant air to supply fluid inlet port 225, metered air flow coming out of a primary differential valve flow control element 282 travels through a primary differential valve piston guide recess 230, a primary differential valve control flow passage "A" 256, a primary differential valve control flow passage "B" 259 and a primary differential valve control flow passage "C" 261. Air flow is supplied at sufficient pressure and volume and, in adequate time, to a primary differential valve upper chamber 258, so as to provide a positive differential pressure force across a primary differential valve piston 205 between primary differential valve upper chamber 258 and a primary differential valve middle chamber 264 which is greater than the positive differential pressure force across primary differential valve piston 205, which is slidably disposed in housing 214, between a primary differential valve lower chamber 276 and primary differential valve middle chamber 264 to cause a primary differential valve piston seat seal 278, made of a pliable material, to press against a primary differential valve piston seat 277, thus maintaining the automated integrated input-output control system apparatus 10 in its normal shut-off position. A primary differential valve middle chamber 263 is always open to the atmosphere to maintain ambient pressure in primary differential valve middle chamber 264.

Further, in the normal shut off position, primary differential valve piston seat seal 278 is held firmly against a primary differential valve piston seat 277, thus permitting plant air to immediately be supplied from supply fluid peripheral manifold 218 to the following areas including, but not limited to a sensor transducer flow passage "A" 219, a sensor transducer nozzle and feedback element 221, a sensor connection port 223, a sensor extension line 301, a sensor device flow passage "C" 309, a sensor device flow passage "B" 307, a sensor device flow passage "A" 305, a primary differential valve piston port "B" 279, a primary differential valve output flow passage "B" 281, a primary differential valve piston vent port "B" 280, a primary flow output port "B" 266, primary differential valve flow control element 282, primary differential valve piston guide recess 230, primary differential valve control flow passage "A" 256, primary differential valve control flow passage "B" 259, primary differential valve control flow passage "C" 261, primary differential valve upper chamber 258, a spacer "A" flow passage component 204, a stop valve flow passage "A" 201, a stop valve 234, a secondary flow output adjustable flow valve 248, a secondary flow output one way flow valve 246, held in position by a secondary flow output one way flow valve set screw 247 and a secondary output connector 245.

Secondary flow output adjustable flow valve 248 regulates air flow to secondary flow output one-way flow valve 246 on through secondary output connector 245 and then to any output device that requires a programmable pressurized air at low flow rates such as an air cylinder or custom piston machinery. A secondary flow output adjustable flow passage plug 249 maintains the flow at required pressure entering secondary flow output adjustable flow valve 248 and blocks flow from entering timer volume flow passage "C" 251.

Secondary flow output adjustable flow valve 248 can be, in a preferred embodiment, a custom made needle valve, but may be a modified Clippard MNV3 model fine adjustment needle valve with custom dimensions and o'ring seals added to accommodate the positive pressure requirements of the present invention. Secondary flow output one way flow valve 246 can be, in a preferred embodiment, a custom made check valve, but may be a modified Clippard MCV2 model check valve with custom dimensions and o'ring seals added to accommodate the positive pressure requirements of the automated integrated input-output control system apparatus 10.

Again referring to FIGS. 1–7, sensor mechanism 300 can be remotely located on or be made as an integral part of other machinery or portable tools and its components are disposed within a sensor housing 303. Sensor mechanism 300 is programmable in that a sensor adjustment device 302 is threadedly disposed within sensor housing 303 mating threads, thus permitting an operator to preset the relative distance of a sensor device position detector seal 306 from a position to be measured, such as a cylinder component or other industrial equipment component position. It is envisioned that, in a preferred embodiment, the sensor adjustment device 302 will have indicated markings for setting various relative positions. Sensor adjustment device 302 can be fitted with various geometrical configurations that would permit the operator to turn it on the internal sensor housing 303 threads. Sensor adjustment device 302 is also fitted with a sensor device o'rings 304 installed at several locations to provide adequate sealing as required. Sensor device position detector seal 306 can be made of a pliable material which both cushions the effect of position detection and permits the build-up of adequate pressure required as an input to the sensor transducer nozzle and feedback element 221. When sensor device position detector seal 306 is not depressed against an object position to be sensed, low pressure is maintained in the sensor transducer nozzle and feedback element 221 area. A sensor device flow passage plug 308 allows access to sensor device flow passage "A" 305, sensor device flow passage "B" 307 and sensor device flow passage "C" 309.

Again referring to FIGS. 1–4 and 6–7, when the automated integrated input-output control system apparatus 10 is in its normal shut-off position, maximum supply pressure is maintained in primary differential valve upper chamber 258, a sensor flow passage "A" 208, a input flow passage "B" 209, a input flow passage "C" 210, and a spacer "B" flow passage 215. High pressure flow is blocked to sensor transducer nozzle and feedback element 221 area by a one way flow valve "A" 217, thus permitting high pressure to be maintained so as to maintain the automated integrated input-output control system apparatus 10 in its normal shut-off position when primary differential valve piston seat seal 278 is held firmly against primary differential valve piston seat 277.

In the preferred embodiment, most of the components are round or cylindrical in geometry but may be of other type geometry in specific designs in automated integrated input-output control system apparatus 10. A spacer "B" 216 is cylindrical in shape with spacer "B" flow passage 215 made an integral part thereof. Spacer "B" 216 also has o'rings to provide pressure sealing within housing 214 and a spacer "B" o'ring 213 that seals against housing cap 211 when a housing cap bolts 260 are tightened into housing 214. A sensor transducer housing 222 has integral o'rings for maintaining pressure as required and is held firm in housing 214 by a sensor transducer housing set screw 220. Sensor transducer housing 222 has a unique flow geometry which produces subsonic and supersonic flow depending on the design, sensor transducer nozzle and feedback element 221, that permits low pressure to be present at the entrance of one way flow valve "A" 217 when sensor mechanism 300 is not activated.

Spacer "A"-flow passage component 204 has integral o'rings to provide for pressure sealing and a spacer "A" o'ring seal 202 that seals against housing cap 211 when housing cap bolts 260 are tightened into housing 214. Spacer "A"-flow passage component 204 is supplied with air from an interconnecting flow passage connected to supply fluid inlet port 225. A housing o'ring 203 seal provides for pressure sealing between 214 and housing cap 211 when housing cap bolts 260 are tightened into housing 214. Required pressures are also maintained within automated integrated input-output control system apparatus 10 by various piston seals including, but not limited to a primary differential valve piston seal "A" 262, a primary differential valve piston seal "B" 267, a primary differential valve piston seal "C" 268, a primary differential valve piston seal "D" 269, a primary differential valve piston seal "E" 271, and a primary differential valve piston seal "F" 272, all of which are utilized to maintain positive pressure in specific areas as the primary differential valve piston 205 moves from normal shut-off position to open position. Primary flow output control port "A" 224 is free to vent through a primary differential valve output flow passage "A" 273 and out through a primary differential valve piston vent port "A" 274 and to the atmosphere through a primary flow output vent port "A" 270.

Referring to FIGS. 1–7, when a start valve 206 is depressed to vent primary differential pressure valve upper chamber 258 or a vent signal, which releases pressure to the atmosphere, is present at a external input control port 212 to vent primary differential valve upper chamber 258 the reversal of differential pressure force across primary differential valve piston 205. This vent input signal to external input control port 212 could come from a pneumatic device or an electrical, mechanical or hydraulic device that is designed to interface with pneumatic signals. The reversal of the differential pressure force causes primary differential valve piston seat seal 278 to move off primary differential valve piston seat 277. In a preferred embodiment, start valve 206 can be custom made or a Clippard MAV2C model two way poppet cartridge valve with o'ring sealing capability or be a custom design two way valve to meet specific design venting conditions of primary differential valve upper chamber 258 with o'ring seals added to accommodate the positive pressure requirements of the present invention. Start valve 206 is held firm in housing cap 211 by a start valve set screw 207.

In the start mode, air flow is vented at sufficient flow rate in primary differential valve upper chamber 258 thru a start valve vent passage 226, so as to provide a positive differential pressure force across primary differential valve piston 205 between primary differential valve upper chamber 258 and primary differential valve middle chamber 264 which is less than the positive differential pressure force across primary differential valve piston 205 between a primary differential valve lower chamber 276 and primary differential valve middle chamber 264. This reversal of differential pressure force causes primary differential valve piston seat seal 278 to move away from primary differential valve piston seat 277 toward housing cap 211, where primary differential valve piston 205 slides axially within housing 214, thus changing the automated integrated input-output control system apparatus 10 from its normal shut-off position to open position.

When start valve 206 is depressed to vent primary differential valve upper chamber 258 through a start valve vent passage 226 or a vent signal is present at external input control port 212 to vent primary differential valve upper chamber 258, also vented to low pressure is sensor flow passage "A" 208, input flow passage "B" 209, input flow passage "C" 210, and spacer "B" flow passage 215. Low pressure is also maintained at sensor transducer nozzle and feedback element 221 area and one way flow valve "A" 217.

When primary differential valve piston seat 277 moves off primary differential valve piston seat seal 278, plant air enters a primary differential valve piston port "A" 275, thereby supplying air to primary differential valve output flow passage "A" 273 and out through primary flow output port "A" 224. Air supply flow to primary flow output port "B" 266 via primary differential valve piston port "B" 279, primary differential valve output flow passage "B" 281 and primary differential valve piston vent port "B" 280 is now blocked by primary differential valve piston seal "D" 269. The blocked pressurized air that was supplied to primary flow output port "B" 266 by primary differential valve output flow passage "B" 281 and the pressurized air that existed in primary flow output port "B" 266 is now free to vent through primary differential valve output piston port "B" 279 and primary differential valve output flow passage "B" 281 and out through primary differential valve piston vent port "B" 280 to a primary flow output vent port "B" 265. The flow path to primary flow vent output port "A" 270 is now blocked by primary differential valve piston seal "E" 271 and primary differential valve piston seal "F" 272. Primary differential valve piston seal "B" 267 and primary differential valve piston seal "C" 268 provide for isolation of vent flow through primary differential valve piston vent port "B" 280 and out through primary flow output vent port "B" 265. Primary differential valve piston seal "A" 262 provides for differential pressure sealing of primary differential valve piston 205 between primary differential valve upper chamber 258 and primary differential valve middle chamber 264. Primary differential valve piston seal "D" 269 also provides for differential pressure sealing of primary differential valve piston 205 between primary differential valve lower chamber 276 and primary differential valve middle chamber 264.

Again referring to FIGS. 1–8, when primary differential valve piston seat 277 moves off primary differential valve piston seat seal 278, plant air can no longer pass through primary differential valve flow control element 282 and out through a primary differential valve piston bleed hole 254 because a primary differential valve housing cap seat seal 255 blocks the supply air. A primary differential valve guide seal 257 provides for sealing in primary differential valve piston guide recess 230. Thus, low pressure is maintained in primary differential valve upper chamber 258, also vented to low pressure is sensor flow passage "A" 208, input flow passage "B" 209, input flow passage "C" 210, and spacer "B" flow passage 215. Low pressure is also maintained at sensor transducer nozzle and feedback element 221 area and one way flow valve "A" 217.

When primary differential valve piston seat 277 moves off primary differential valve piston seat seal 278, plant air is now free to enter and flow through a timed vent output control flow passage 237 and pressurize a timed vent output volume chamber 236 where a timed vent output flow passage plug 235 with its integrated o'rings prevents the pressurized air from escaping through the area between housing cap 211 and housing 214. A timed vent output timer flow regulator 238 provides for a programmed bleed rate of the air in timed vent output volume chamber 236 where pressure is also maintained by a timed vent output piston 240, which is slidably disposed in timed vent output volume chamber 236, with its o'rings, and restrained by a timed vent output piston guide pin 239 to keep flow from escaping from timed vent output volume chamber 236 cylindrical surface area. The timed vent output piston 240 seat seal pressured against a timed vent output piston seat 243, which is held in place by a timed vent output piston seat set screw 242, also prevents pressurized flow from an external source from venting through a timed vent output vent flow passage 241 because the differential pressure force across timed vent output piston 240 and its seat area is great enough to force the timed vent output piston 240 seat seal against timed vent output piston seat 243 until such time as automated integrated input-output control system apparatus 10 is returned from its open position to normal shut-off position and the pressure in timed vent output volume chamber 236 is permitted to bleed down over a preprogrammed time as set by timed vent output timer flow regulator 238 adjustments. At that point, an external apparatus that was pressurized could be permitted to become depressurized through a timed vent output device connector 244 on through the timed vent output piston seat 243 and venting out to the atmosphere through timed vent output vent flow passage 241. The timer vent output controls are shown as analog, but could be pneumatic or fluidic digital controls (not shown).

When primary differential valve piston seat 277 moves off primary differential valve piston seat seal 278, plant air is now free to enter and flow through, one or more, a timer adjustable flow valves 250 (only one shown) so as to provide a preprogrammed timed shut down, (automated integrated input-output control system apparatus 10 is returned from its open position to normal shut-off position) at a preprogrammed time. Timer adjustable flow valves 250 can be, in a preferred embodiment, a custom made needle valve, but may be a modified Clippard MNV3 model fine adjustment needle valve with custom dimensions and o'ring seals added to accommodate the positive pressure requirements of the present invention. Air flowing through timer adjustable flow valves 250 enters at timer volume flow passage "C" 251 and on through a timer one way flow valve 252 which is held in position by a timer one-way flow valve set screw 253. Timer one way flow valve 252 can be, in a preferred embodiment, a custom made check valve, but may be a modified Clippard MCV2 model check valve with custom dimensions and o'ring seals added to accommodate the positive pressure requirements of the automated integrated input-output control system apparatus 10. Air flow continues on through a timer flow passage "B" 229 and then on through a timer flow passage "A" 228 and into primary differential valve upper chamber 258 where pressurization takes place to upset the balance of differential pressure across primary differential valve piston 205 to cause automated integrated input-output control system apparatus 10 to returned from its open position to normal shut-off position. It is noted that a timer flow passage plug 227 and its integrated o'rings prohibit air flow from entering the area between housing cap 211 and housing 214.

Stop valve 234 could also be used, in a preferred embodiment, as an operator intervention device, for a stop or shut down command to return the automated integrated input-output control system apparatus 10 to its normal shut-off position. Stop valve 234 can be custom made or a Clippard MAV2C model two way poppet cartridge valve with o'ring sealing capability or be a custom design two way valve, with o'ring seals added to accommodate the positive pressure requirements of the present invention, to meet specific design pressurization requirements of primary differential valve upper chamber 258. Stop valve 234 is held firm in housing cap 211 by a set screw (not shown). Air flow enters stop valve 234 directly from supply fluid inlet port 225 and its interface flow passage, on through spacer "A" flow passage component 204 which has integral o'rings to seal off the pressure including, but not limited to spacer "A" o'ring seal 202, then on through stop valve flow passage "A" 201, then on through a stop valve flow passage "B" 231, then on through a stop valve flow passage "C" 232, then on through a stop valve flow passage "D" 233 on to pressurized primary differential valve upper chamber 258. Pressurization of primary differential valve upper chamber 258 upsets the balance of differential pressure across primary differential valve piston 205 to cause automated integrated input-output control system apparatus 10 to return from its open position to normal shut-off position, whereas pressure and flow parameters are as described in the shut off condition. External input control port 212 could also be used for a stop or shut down command by the introduction of an adequate pressurized flow signal from a pneumatic device or electrical, mechanical or hydraulic device design to interface with pneumatic equipment at adequate pressure levels.

Although particular detailed embodiments of the apparatus and method have been described herein, it should be understood that the invention is not restricted to the details of the preferred embodiment. Many changes in design, composition, configuration and dimensions are possible without departing from the spirit and scope of the instant invention.

OPERATION

Operation of automated integrated input-output control system apparatus 10 is governed by control-power mechanism 200. For the purpose of the following discussion, the upper proximal end of automated integrated input-output control system apparatus 10 is identified as housing cap 211. The lower distal end of automated integrated input-output control system apparatus 10 is identified as primary flow output port "A" 224.

For the purpose of discussion of the operation of the automated integrated input-output control system apparatus 10, we will consider that a universal control apparatus is being set up and utilized in an industrial setting. However, it is emphasized that the automated integrated input-output control system apparatus 10 could become an integral part of an industrial air tool or machine and that setup would not be required. Prior to commencing the use of the automated integrated input-output control system apparatus 10, the operator must first install control-power mechanism 200 in a suitable area near the industrial tool or industry machine to be controlled. The control-power mechanism 200 can be hastened in place via a bracket (not shown) for permanent installation. The operator then connects sensor mechanism 300 to control-power mechanism 200 via a conduit and connectors. The sensor mechanism 300 can be fastened in place via a bracket (not shown) for permanent installation. Output devices could be air cylinders, air motors, actuators, electrical interface devices, hydraulic interface devices and mechanical interface devices. Input devices could be also be electrical interface devices, hydraulic interface devices and mechanical interface device, in addition to the pneumatic inputs connected to external input control port 212 to either simulate a start signal or stop signal.

The operator now has to make a number of setup decisions depending on the industrial application that is being controlled by automated integrated input-output control system apparatus 10. The operator has the choice of using the apparatus to control various functions including, but not limited to: (1)one or more primary flow outputs which are high pressure and high flow to attached devices; (2) one or more primary vent outputs which vent the high pressure flow from the attached devices; (3) one or more secondary programmable pressurization low flow outputs which provide programmable metered high pressure low flow rate to an attached output device; (4) one or more internal programmable timers to override sensor inputs; (5) one or more adjustable position sensors inputs; (6) one or more external device inputs for starting and shutting down the apparatus; and (7) one or more programmable vent type outputs for venting an external pressurized source. Again, it is emphasized that automated integrated input-output control system apparatus 10 could become an integral part of an industrial air tool or machine and that the setup procedure would not be required because all input and output parameters would become a permanent part of the particular tool or application. Once specific input and output devices are connected, the system is then physically prepared to make the connection to plant air supply system 100.

The operator connects plant air supply system 100 to an air compressor or industry plant air line. In initiating the setup operation, the operator first determines, by reference to a regulator pressure gauge (not shown), that desired plant air pressure and flow capability are insured. Preferably, filtered plant air supply system 100 is connected to power source quick disconnect (not shown). A quick disconnect permits the ease of connecting and disconnecting automated integrated input-output control system apparatus 10 to any standard plant air supply system. In a preferred embodiment setup, a three way ball valve is first connected to an air filter-lubricator-dryer assembly which are connected to control-power mechanism 200 via a quick disconnect which connects to a mating quick disconnect part (not shown) threaded into supply fluid inlet port 225.

Filtered plant air from a flexible connection hose (not shown) enters automated integrated input-output control system apparatus 10 at a preferred air pressure of 80 to 120 PSIG via supply fluid inlet port 225. Plant air entering via supply fluid inlet port 225 is channeled to supply fluid peripheral manifold 218, which provides for plant air movement to other areas of automated integrated input-output control system apparatus 10. With the introduction of air into supply fluid peripheral manifold 218, air is simultaneously channeled to primary differential valve flow control element 282, then on through primary differential valve piston bleed hole 254, primary differential valve piston guide recess 230, primary differential valve control flow passage "A" 256, primary differential valve control flow passage "B" 259 and a primary differential valve control flow passage "C" 261 and into primary differential valve upper chamber 258. The pressure in primary differential valve upper chamber 258 provides for a positive differential pressure force across a primary differential valve piston 205 between primary differential valve upper chamber 258 and primary differential valve middle chamber 264 which is greater than the positive differential pressure force in the opposite direction across primary differential valve piston 205 between primary differential valve lower chamber 276 and primary differential valve middle chamber 264 to cause primary differential valve piston seat seal 278 to press against a primary differential valve piston seat 277, thus maintaining the automated integrated input-output control system apparatus 10 in its normal shut-off position.

To better understand the operation of the apparatus, the direction of the primary flow output is contingent on the position of primary differential valve piston 205 within housing 214, a position which determines whether primary flow exits primary flow output port "A" 224 or primary flow output port "B" 266 or if flow from attached devices is vented out primary flow output vent port "A" 270 or primary flow output vent port "B" 265, depending on whether automated integrated input-output control system apparatus 10 is in its normal shut-off position or open position. When air is initially introduced to supply fluid peripheral manifold 218, primary differential valve upper chamber 258 is pressurized by the introduction of air through primary differential valve control flow passage "C" 261. It is important to note that primary differential valve middle chamber 264 is continually vented to the atmosphere through primary differential valve middle chamber vent 263.

The pressure introduced to primary differential valve upper chamber 258 is approximately the same pressure regulated from plant air supply system 100. Therefore, upon connection and energizing of plant air supply system 100 after the quick disconnect is safely in place, there will immediately be a pressure differential force across primary differential valve piston 205 which causes primary differential valve piston 205 to slidably move forward toward the lower distal end of automated integrated input-output control system apparatus 10. This causes primary differential valve piston seat seal 278 to automatically seat primary differential valve piston seat 277, thus effectively blocking air flow to primary flow output port "A" 224.

The aforementioned differential pressure force exists because of a greater pressure on an upper proximal end of primary differential valve piston 205, as compared to the pressure in primary differential valve middle chamber 264, which is approximately ambient pressure. A lower pressure differential force also exists in the opposite direction, attempting to move primary differential valve piston 205 back toward the upper distal end of automated integrated input-output control system apparatus 10. This pressure differential exists because plant air supply system 100 pressure contained in supply fluid peripheral manifold 218, acts on the lower distal end of primary differential valve piston 205 causing a differential pressure force to exist based on the pressure in supply fluid peripheral manifold 218 and the low ambient pressure in primary differential valve middle chamber 264. However, since the areas on opposite sides of primary differential valve piston 205 are significantly different in pressure force reaction area, the overriding differential pressure force maintains the desired position of primary differential valve piston 205, as required for a particular operational mode. Provisions can be made, if required under certain design conditions, to assure that primary differential valve piston 205 starts off in a forward position toward the lower distal end of automated integrated input-output control system apparatus 10, when plant air supply system 100 is not connected, by use of primary differential valve piston 205 piston spring (not shown) located in primary differential valve piston guide recess 230, which constantly applied a positive force on primary differential valve piston 205 toward the lower distal end of automated integrated input-output control system apparatus 10.

At this point, in the normal shut off position, primary differential valve piston seat seal 278 is held firmly against primary differential valve piston seat 277 thus permitting plant air to immediately be supplied to sensor transducer flow passage "A" 219, sensor transducer nozzle and feedback element 221 where subsonic to supersonic flow conditions exist, sensor connection port 223, sensor extension line 301, sensor device flow passage "C" 309, sensor device flow passage "B" 307, sensor device flow passage "A" 305, primary differential valve piston port "B" 279, primary differential valve output flow passage "B" 281, primary differential valve piston vent port "B" 280, primary flow output port "B" 266, primary differential valve flow control element 282, primary differential valve piston guide recess 230, primary differential valve control flow passage "A" 256, primary differential valve control flow passage "B" 259, primary differential valve control flow passage "C" 261, primary differential valve upper chamber 258, spacer "A" flow passage component 204, stop valve flow passage "A" 201, stop valve 234, secondary flow output adjustable flow valve 248, secondary flow output one way flow valve 246, and secondary output connector 245.

Secondary output flow is provided as a source of high pressure low flow rate, where the flow rate is programmable by secondary flow output adjustable flow valve 248 which regulates air flow to secondary flow output one way flow valve 246 and secondary output connector 245 and finally to any output device that requires a programmable pressurized air at low flow rates such as an air cylinder or custom piston located on air tools or machinery. This output control feature would be effective in an integral control system for such devices as air tools and can be designed to operate in normal off or on position. Secondary flow output adjustable flow passage plug 249 maintains a positive pressure and keeps fluid flow from entering timer adjustable flow valve 250 area. Secondary flow output one way flow valve 246 is maintained in place by secondary flow output one way flow valve set screw 247.

When the automated integrated input-output control system apparatus 10 is in its normal shut-off position air flow enters stop valve 234 directly from supply fluid inlet port 225 and its interface flow passage, on through a spacer "A"-flow passage component 204, then on through stop valve flow passage "A" 201, then on through stop valve flow passage "B" 231, then on through stop valve flow passage "C" 232, then on through stop valve flow passage "D" 233 on to the entrance of stop valve 234. Additionally in the normal shutoff mode, primary flow to output port "A" 224 is blocked and its related primary flow output vent port "A" 270 via primary differential valve output flow passage "A" 273 and primary differential valve piston vent port "A" 274, vents any pressurized fluid from one or more devices attached to primary flow output port "A" 224. Simultaneously, primary flow output port "B" 266 is pressurized via primary differential valve piston port "B" 279, primary differential valve output flow passage "B" 281 and primary differential valve piston vent port "B" 280, to provide high pressure flow to one or more attached devices such as cylinders when automated integrated input-output control system apparatus 10 is in its normal shut-off position.

Sensor mechanism 300 can be remotely located on or be made as an integral part of other machinery or tools and its components are disposed within a sensor housing 303. Prior to operation, the operator will program sensor mechanism 300 to preset the relative distance of a sensor device position detector seal 306 from a position to be measured by turning sensor adjustment device 302, which is threadedly disposed within sensor housing 303 mating threads. A typical position to be measured would be cylinder component or other industrial equipment component position which is accomplished when sensor device position detector seal 306 is closed off, when its pliable material both cushions the effect of position detection and permits the build-up of adequate pressure required as an input to the sensor transducer nozzle and feedback element 221. When sensor device position detector seal 306 is not depressed against an object position to be sensed, low pressure is maintained in the sensor transducer nozzle and feedback element 221 area by its unique nozzle flow characteristics and feedback characteristics which maintain high velocity low pressure flow until sensor mechanism 300 is activated.

When the automated integrated input-output control system apparatus 10 is in its normal shut-off position, maximum supply pressure is maintained in primary differential valve upper chamber 258, a sensor flow passage "A" 208, input flow passage "B" 209, input flow passage "C" 210, and a spacer "B" flow passage 215. High pressure flow is blocked to sensor transducer nozzle and feedback element 221 area by one way flow valve "A" 217, thus permitting automated integrated input-output control system apparatus 10 high pressure to be maintained in its normal shut-off position where the differential pressure force on primary differential valve piston 205 causes primary differential valve piston 205 to slidably maintain its forward position toward the lower distal end of the apparatus, whereas primary differential valve piston seat seal 278 is held firmly against a primary differential valve piston seat 277.

Sensor transducer housing 222 has a unique internal flow geometry in that sensor transducer nozzle and feedback element 221, permits low pressure to be present at the entrance of one way flow valve "A" 217 when sensor mechanism 300 is not activated. This low pressure is created by matching the fluid flow characteristics of sensor transducer nozzle and feedback element 221 with sensor device flow passage "A" 305, sensor device flow passage "B" 307, and sensor device flow passage "C" 309, so as to permit subsonic or supersonic flow low pressure characteristics in both sensor transducer nozzle and feedback element 221 and at the distal end entrance of one way flow valve "A" 217 when sensor mechanism 300 is not activated by the sensing of a position of a specific element and sensor device position detector seal 306 is not pressed up against that element.

Having reviewed the operation characteristics of automated integrated input-output control system apparatus 10 in its normal shut-off position when plant air supply system 100 was initially connected, we will look at the operational characteristics of the apparatus when a start signal is either manually given by the operator by depressing start valve 206 or a vent signal is present at an external input control port 212. This vent input signal to external input control port 212 could come from a pneumatic device or all electrical, mechanical or hydraulic device that is designed to interface with pneumatic signals. When a start valve 206 is depressed to vent primary differential valve upper chamber 258 through start valve vent passage 226 or a vent signal, which releases pressure to the atmosphere, is present at a external input control port 212 to vent primary differential valve upper chamber 258 at sufficient flow rate in primary differential valve upper chamber 258, so as to provide a positive differential pressure force across primary differential valve piston 205 between primary differential valve upper chamber 258 and primary differential valve middle chamber 264, which is less than the positive differential pressure force across primary differential valve piston 205 between a primary differential valve lower chamber 276 and primary differential valve middle chamber 264. This reversal of differential pressure force causes primary differential valve piston seat seal 278 to move away from and off of primary differential valve piston seat 277 toward housing cap 211, where primary differential valve piston 205 slides axially within housing 214, thus changing the automated integrated input-output control system apparatus 10 from its normal shut-off position to open position.

Simultaneously to the aforementioned, when start valve 206 is depressed to vent primary differential valve upper chamber 258 or a vent signal is present at external input control port 212 to vent primary differential valve upper chamber 258, sensor flow passage "A" 208, input flow passage "B" 209, input flow passage "C" 210, and spacer "B" flow passage 215 are also vented, creating low pressure in each of these interconnected flow areas. Low pressure is also maintained at sensor transducer nozzle and feedback element 221 area and one way flow valve "A" 217 when sensor mechanism 300 is not activated. When primary differential valve piston seat 277 moves off primary differential valve piston seat seal 278, plant air enters a primary differential valve piston vent port "A" 274, thereby supplying air to a primary differential valve output flow passage "A" 273 and out through primary flow output port "A" 224. Pressurized air that was supplied to a primary flow output port "B" 266 via primary differential valve piston port "B" 279, primary differential valve output flow passage "B" 281 and primary differential valve vent port "B" 280 has been blocked and the pressurized air that existed in primary flow output port "B" 266 and its attached device is free to vent through primary differential valve piston port "B" 279, primary differential valve output flow passage "B" 281 and primary differential valve piston vent port "B" 280 and on through primary flow output vent port "B" 265.

Further, when primary differential valve piston seat 277 moves off primary differential valve piston seat seal 278, plant air can no longer pass through primary differential valve flow control element 282 and out through a primary differential valve piston bleed hole 254 because primary differential valve housing cap seat seal 255 blocks the supply air. Thus, low pressure is maintained in primary differential valve upper chamber 258, also at low pressure in sensor flow passage "A" 208, input flow passage "B" 209, an input flow passage "C" 210, and spacer "B" flow passage 215. Low pressure is also maintained at sensor transducer nozzle and feedback element 221 area and one way flow valve "A" 217.

Furthermore, when primary differential valve piston seat 277 moves off primary differential valve piston seat seal 278, plant air is now free to enter and flow through a timed vent output control flow passage 237 and pressurize a timed vent output volume chamber 236 where a timed vent output flow passage plug 235 and seals prevent the pressurized air from escaping through the area between housing cap 211 and housing 214 when housing cap bolts 260 are tightened in housing 214 causing housing o'ring 203 to compress. A programmable timed vent output timer flow regulator 238 provides for a preprogrammed bleed rate of the air in timed vent output volume chamber 236 where pressure is also maintained by a timed vent output piston 240, which is restrained by timed vent output piston guide pin 239, to keep flow from escaping from timed vent output volume chamber 236 cylindrical surface area. The timed vent output piston 240 seat seal pressured against a timed vent output piston seat 243 also prevents pressurized flow from an external source from venting through a timed vent output vent flow passage 241 to the atmosphere because the differential pressure force across timed vent output piston 240 and its seat area is great enough to force the timed vent output piston 240 seat seal against timed vent output piston seat 243. This condition remains until such time as automated integrated input-output control system apparatus 10 is returned from its open position to normal shut-off position and the pressure in timed vent output volume chamber 236 is permitted to bleed down over a preprogrammed time set by timed vent output timer flow regulator 238 adjustments. At that point, an external apparatus that was pressurized could be permitted to become depressurized through a timed vent output device connector 244 on through the timed vent output piston seat 243 and venting out to the atmosphere through timed vent output vent flow passage 241 after timed vent output piston 240, slidably disposed in timed vent volume chamber 236, moves off timed vent output piston seat 243 due to changes in differential pressure. The timed vent output control described herein is analog in operation, but could be configured of pneumatic or fluidic digital geometry and could be used as an internal input device.

Further, when primary differential valve piston seat 277 moves off primary differential valve piston seat seal 278, plant air is now free to enter and flow through, one or more, timer adjustable flow valves 250 (only one shown) so as to provide a preprogrammed timed shut down, (automated integrated input-output control system apparatus 10 is returned from its open position to normal shut-off position) at a preprogrammed time. Air flowing through timer adjustable flow valves 250 enters a timer volume flow passage "C" 251 and on through a timer one way flow valve 252. Air flow continues on through a timer flow passage "B" 229 and then on through timer flow passage "A" 228 and into primary differential valve upper chamber 258 where pressurization takes place to upset the balance of differential pressure across primary differential valve piston 205 to cause automated integrated input-output control system apparatus 10 to return from its open position to normal shut-off position. It is noted that a timer flow passage plug 227 prohibits air flow from entering the area between housing cap 211 and housing 214.

Sensor mechanism 300 could also be used, in a preferred embodiment, as an programmable shut down command, if activated before the programmed timed shut down, to return the automated integrated input-output control system apparatus 10 to its normal shut-off position. Sensor mechanism 300, remotely located on or made as an integral part of other machinery or tools, and its components are disposed within a sensor housing 303. Prior to operation, the operator will program sensor mechanism 300 to preset the relative distance of a sensor device position detector seal 306 from a position to be measured by turning sensor adjustment device 302, which is threadedly disposed within sensor housing 303 mating threads. A typical position to be measured would be cylinder component or industrial tool relative location or other industrial equipment component position which is accomplished when sensor device position detector seal 306 is closed off, when its pliable material both cushions the effect of position detection and permits the build-up of adequate pressure required as an input to the sensor transducer nozzle and feedback element 221.

The change of low to high pressure flow when sensor device position detector seal 306 is closed off, occurs via sensor device flow passage "A" 305, sensor device flow passage "B" 307, and sensor device flow passage "C" 309, sensor extension line 301 so as to change the low pressure characteristics to high pressure in sensor transducer nozzle and feedback element 221, one way flow valve "A" 217, spacer "B" flow passage 215, input flow passage "C" 210, input flow passage "B" 209, and into primary differential valve upper chamber 258 where pressurization takes place to upset the balance of differential pressure across primary differential valve piston 205 to cause automated integrated input-output control system apparatus 10 to return from its open position to normal shut-off position. It is noted that spacer "B" o'ring 213 prohibits air flow from entering the area between housing cap 211 and housing 214.

A stop valve 234 could also be used, in a preferred embodiment, as an operator intervention device, for a stop or shut down command to return the automated integrated input-output control system apparatus 10 to its normal shut-off position. Stop valve 234 is held firm in housing cap 211 by a set screw (not shown). Air flow enters stop valve 234 directly from supply fluid inlet port 225 and its interface flow passage, on through a spacer "A" flow passage component 204, then on through stop valve flow passage "A" 201, then on through stop valve flow passage "B" 231, then on through stop valve flow passage "C" 232, then on through stop valve flow passage "D" 233 on to pressurized primary differential valve upper chamber 258. Pressurization of primary differential valve upper chamber 258 upsets the balance of differential pressure across primary differential valve piston 205 to cause automated integrated input-output control system apparatus 10 to return from its open position to normal shut-off position, whereas pressure and flow parameters are as previously described in the shut off condition. External input control port 212 could also be used for a stop or shut down command by the introduction of an adequate pressurized flow signal from a pneumatic device or electrical, mechanical or hydraulic device design to interface with pneumatic equipment at adequate pressure levels or even an internal output signal, such as from timed vent output device connector 244.

Primary flow output port "B" 266 or primary flow output vent port "A" 270 or primary flow output vent port "B" 265 can be plugged by the operator when setting up and installing automated integrated input-output control system apparatus 10 if not required to keep unwanted loss of primary air flow. The timers described herein and the secondary output flows and secondary vent output can be duplicated within the housing 214 to provide added programmable control system capability.

From the foregoing description, those skilled in the art will appreciate that all of the objects of the present invention are realized. A unique automated integrated input-output control system apparatus 10 has been shown and described which can be utilized in industrial settings and in the field. While specific embodiments have been shown and described, many variations are possible. The device can be manufactured in different sizes by scaling the design up or down. The apparatus can be manufactured of various materials which exhibit desirable operating characteristics, such as light weight, durable metals or plastics. A digital fluidic device timing may provide the timing function. Various power sources may be used and interface devices such as such as electrical, hydraulic, and hybrids will complement the operation.

Having described the invention in detail, those skilled in the art will appreciate that modifications may be made to the invention without departing from its spirit. Therefore, it is not intended that the scope of the invention be limited to the specific embodiments illustrated and described.

What is claimed is:

1. An automated integrated input-output control system apparatus for programmable control of tools, machinery and manufacturing processes, where the control system comprises input capability, output capability, and programmable capability, said apparatus comprising:

an automated integrated input-output control system apparatus, comprising a control-power mechanism housing, a piston slidably and axially disposed in said automated integrated input-output control system apparatus housing so that axial movement is achieved when a differential pressure force is produced;

an input means disposed in said control-power mechanism housing to permit attachment of input devices;

an output means disposed in said control-power mechanism housing to permit attachment of output devices; and and, for providing for controlling said input devices and output devices.

2. The apparatus of claim 1 wherein said control system is programmable.

3. The apparatus of claim 2 wherein said control system can be incorporated in said control-power mechanism housing or be made integral to a portable tool or fixed machine application.

4. The apparatus of claim 1 wherein said input means provides for input connection interface to external machinery, control systems, tools or other remote apparatuses.

5. The apparatus of claim 4 wherein said input connection interface may be a threaded, bolted, twist lock or other type connection.

6. The apparatus of claim 1 wherein said output means provides for output connection interface with external machinery, control systems, tools or other remote apparatuses.

7. The apparatus of claim 6 wherein said output connection interface may be a threaded, bolted, twist lock or other type connection.

8. The apparatus of claim 1 wherein said piston is generally cylindrical in shape and can be fabricated from a variety of materials.

9. The apparatus of claim 8 wherein said piston contains valve flow output ports matched to the output flow geometry of the housing and further matches the output flow geometry of said control-power mechanism housing, so as to provide two way, three way and four way valve flow outputs.

10. The apparatus of claim 1 wherein said control-power mechanism housing further comprises one or more pressurized chambers defined within said control-power mechanism housing, wherein said pressurization chambers are in fluid communication with a source of pressurized fluid.

11. The apparatus of claim 10 further comprising pressure seals disposed externally on said piston to prevent fluid pressure from escaping said pressurization chambers during control sequencing phases.

12. The apparatus of claim 10 wherein said piston is slidably and axially disposed within said control-power mechanism housing, and further wherein introduction of fluid in said pressurized chambers results in axial movement of said piston within said control-power mechanism housing, thereby permitting opening and closing of said valve flow output ports.

13. The apparatus of claim 1 wherein said housing comprises a support means to attach said housing to machinery.

14. The apparatus of claim 13 where said support means can be a bracket which may be bolted on to said housing and attached to machinery.

15. The apparatus of claim 1 wherein said apparatus components can be integrated into a specific machine or portable tool.

16. The apparatus of claim 1 wherein said automated integrated input-output control system apparatus can be used as a modular control system attached to a portable air tool.

17. An automated integrated input-output control system apparatus for programmable control of tools, machinery and manufacturing processes, where the control system comprises input capability, output capability, and programmable capability, said apparatus comprising:

- a programmable control system for controlling the operation of said apparatus comprising control flow passages and control elements;
- an automated integrated input-output control system apparatus, comprising a control-power mechanism housing, a piston slidably and axially disposed in said automated integrated input-output control system apparatus housing so that an axial force is produced;
- a fluid supply system comprising a plurality of pressure-flow passages operably connected to said control-power mechanism housing, said fluid system conveying fluid to said control system to circulate fluid to said input devices and said output devices;
- an input connection interface means disposed in said control-power mechanism housing to permit attachment of input devices;
- an output connection interface means disposed in said control-power mechanism housing to permit attachment of output devices;
- a remote adjustable programmable sensor element which is attachable to remote machinery and to said control-power mechanism housing;
- one or more pressurization chambers defined with said control-power mechanism housing, wherein said pressurization chambers are in fluid communication with a source of pressurized fluid; and
- a regulating device connected to said plant air is pressurized and is supplied to said apparatus through a releasable coupling element attached to said control-power mechanism housing.

18. The apparatus of claim 17 wherein said control-power mechanism housing output ports are arranged so as to provide two way valve, three way valve and four way valve high flow high pressure output characteristics, and further said output connection interface means disposed in said control-power mechanism housing to permit attachment of output devices as required to meet specific flow conditions.

19. The apparatus of claim 18 wherein said control-power mechanism housing output ports can be plugged so as to specifically provide for two way valve, three way valve and four way valve high flow high pressure output characteristics.

20. The apparatus of claim 17 wherein said piston geometry is designed to match said control-power mechanism housing output ports so as to provide two way valve, three way valve and four way valve high flow high pressure output characteristics.

21. The apparatus of claim 17 wherein said remote adjustable programmable sensor element can be mounted on machinery, further said remote adjustable programmable sensor element can be connected to said input connection interface means disposed in said control-power mechanism housing to permit the sensing of a component or machine operation.

22. The apparatus of claim 17 wherein said input connection interface means disposed in said control-power mechanism housing to permit the connection of input devices such as hydraulic, pneumatic, mechanical, electrical and other devices such as transducer devices that convert all input signals to pressurized fluid flow signals.

23. The apparatus of claim 17 wherein said output connection interface means disposed in said control-power mechanism housing to permit the connection of said apparatus to output devices such as machinery, tools, industrial equipment or other apparatuses that require pressurized fluid flow to operate.

24. A programmable control system for controlling the operation of automated integrated input-output control system apparatus comprising a control-power mechanism housing, a piston slidably and axially disposed in said automated integrated input-output control system apparatus housing so that various control functions are achieved when a differential axial force is produced so as to circulate pressurized fluid to specific areas under specific conditions;

- a plurality of pressure-flow passages operably connected to said control-power mechanism housing, said flow system conveying fluid to said control system to circulate fluid to said input devices and said output devices;
- a quick disconnect assembly through which plant air flow to said automated integrated input-output control system apparatus, said quick disconnect assembly releasably coupled to said control-power mechanism housing;
- a piston seat to control the primary flow source entering said control-power mechanism housing;
- a start valve connected to the control-power mechanism housing which permits an operator to start the circulation of plant air to said programmable control system and said output devices;
- a stop valve connected to the control-power mechanism housing which permits an operator to stop the circulation of plant air to said programmable control system and said output devices;
- a diagnostic ports disposed within said control-power mechanism housing which permits measurement of pressure at various points in the control system and output connections;
- a programmable first timing means, disposed within said control-power mechanism housing, which overrides the programmable control system to shut down said automated integrated input-output control system apparatus after a preprogrammed time duration;
- a programmable second timing means, analog or digital in operation, disposed within said control-power mechanism housing, which overrides the programmable control system after said start valve has been depressed for a preprogrammed time duration;
- a multiport valve which overrides the control system connected to said control-power mechanism housing, so as to prevent premature operation of said automated integrated input-output control system apparatus;
- a remote programmable sensor coupled to said control-power mechanism housing, which permits programming of a desired position of an industrial or machine tool component and measures the position of said machine tool component in a fixed relationship with a specific component in a manufacturing or machine tool application, so as to provide a pressure signal to start or stop the circulation of pressurized fluid to the output device when the desired relative position is reached;
- a timed vent input disposed within said control-power mechanism housing, which permits depressurization of an external device;

a programmable regulator disposed within said control-power mechanism housing for supplying low pressure low flow output fluid; and the said automated integrated input-output control system apparatus can be made integral to specific machinery or portable hand tools to provide programmable operational characteristics.

25. The apparatus of claim 24 wherein said control system will accept input signals from external tools, machinery or manufacturing processes.

26. The apparatus of claim 25 wherein said control system input signal can be an input signal an apparatus capable of providing an output signal.

27. The apparatus of claim 26 wherein said control system input signal from a pneumatic device can be directly fed into said control system.

28. The apparatus of claim 25 wherein said control system input signal from an electrical, electronic, hydraulic, mechanical or other apparatus is made compatible via a transducer.

29. The apparatus of claim 28 wherein said transducer will convert control system input signal from an apparatus to a pneumatic input.

30. The apparatus of claim 24 wherein said control system comprises a remote sensor mechanism.

31. The apparatus of claim 30 wherein said sensor is programmable adjustable and connected to said housing by means of a pressurized fluid line.

32. The apparatus of claim 31 wherein said sensor feeds its pressure signal to provide an input control signal by means of a matched pressure transducer which is disposed in said control-power mechanism housing.

33. The programmable control system of claim 24 wherein said plant air is pressurized and is supplied to said programmable control system and main output system through a pressure flow line releasably coupled to said control-power mechanism housing.

34. The programmable control system of claim 24 wherein said programmable first timing means and said programmable second timing means can be digital or analog devices.

35. The programmable control system of claim 24 wherein said programmable vent means provides for a timed vent operation of an externally attached device.

36. The programmable control system of claim 24 wherein said plant air is pressurized and is supplied to said programmable control system through a releasable coupling element attached to said control-power mechanism housing.

37. A control apparatus comprising:

a body;

a differential flow valve disposed within said body and defining upper, lower and inlet pressurization chambers, where each of said chambers are selectively coupled in flow communication to fluid flow passages disposed in said body; and a second valve to control the circulation of pressurized fluid to said differential valve; and one or more output portals disposed in said body in selective, fluid communication with said differential valve.

38. The control apparatus of claim 37 wherein said differential flow valve comprises a piston slidably disposed within said body between a first and second position, where the movement of said piston is induced by differential fluid pressure between said upper and lower pressurization chambers.

39. The control apparatus of claim 37 further including a control system disposed within said body and comprising one or more fluid flow passages operatively disposed with respect to said differential flow valve.

40. The control apparatus of claim 39 further including a first and second timing means, where said first timing means is adapted to override the control system after a pre programmed time period and said second timing means is adapted to override the control system to provide for the operation of the apparatus for a programmed timing period.

41. The control apparatus of claim 37 where said control system further comprises:

an inlet portal through which pressurized air is fed into said body;

diagnostic ports disposed in said body to measure pressure throughout said system; and a multiport valve coupled in fluid communication to said differential valve to allow the override of said control system.

42. The control apparatus of claim 37 further comprising a sensor means coupled in fluid communication with said differential valve.

43. The control apparatus of claim 42 where said sensor means is remotely positioned from said body.

44. The control apparatus of claim 37 further comprising a sensor transducer disposed in said body in fluid communication with said sensor means, where said transducer operates to move the differential flow valve between the first and second position upon receiving a pressure signal from said sensor means.

45. An apparatus for controlling the transmissions of pressurized fluid signals comprising:

a housing defining therein a bore;

a piston slidably disposed in said bore between a first and a second position, said piston defining an upper, lower and intermediate chamber in said bore, where the reciprocation of said piston between said first and second position is caused by differential pressure between said upper and lower chambers;

a control system disposed within said housing and disposed in fluid communication with said upper, lower and intermediate chambers, said system comprising one or more fluid passages disposed in said housing and an inlet portal through which a pressurized fluid is introduced into one or more of said passage;

first and second timing means disposed in said housing in fluid communications with said control system, said first and second timing means operative to override said control system to control fluid flow therethrough;

a sensor means coupled in fluid communication to said control system; and a pressure transducer disposed in said housing and in fluid communication with said sensor means and said control system to selectively introduce fluid into said upper or lower chambers to move said piston between said first and second positions upon receiving a pressurized signal from said sensor means.

46. The apparatus of claim 45 where said control system further comprises:

diagnostic ports disposed in said body to measure fluid pressure through said system;

a multiport valve coupled in fluid communication to said piston to allow an override of said control system; and one or more exhaust ports coupled in fluid communication to one or more of said chambers.

47. The apparatus of claim 45 where said sensor means further includes a pressure seal and means to allow the adjustment of said seal from a workpiece.

48. The apparatus of claim 45 where said sensor is remotely situated from the housing.

49. The apparatus of claim 45 where fluid pressure in said control system is maintained at a range of 80–120 pounds per square inch.

50. The apparatus of claim 45 where flow valve through said control system is maintained in a range of 3–100 cubic feet per minute.

* * * * *

UNITED STATES PATENT AND TRADEMARK OFFICE
CERTIFICATE OF CORRECTION

PATENT NO. : 5,923,558
DATED : July 13, 1999
INVENTOR(S) : John William Fix, Jr.

It is certified that error appears in the above-indentified patent and that said Letters Patent is hereby corrected as shown below:

In the Claims:

Claim 1, Column 22, Line 10. Replace "and," with - - a control system. - -

Signed and Sealed this

Twenty-third Day of November, 1999

Attest:

Q. TODD DICKINSON

*Attesting Officer*  *Acting Commissioner of Patents and Trademarks*